(12) United States Patent
Abenstein et al.

(10) Patent No.: US 9,273,809 B2
(45) Date of Patent: Mar. 1, 2016

(54) HYDROSTATIC UNIT AND ADAPTER PIECE

(71) Applicant: Robert Bosch GmbH, Stuttgart (DE)

(72) Inventors: Thomas Abenstein, Buch (DE); Wolfgang Mayer, Duermetingen (DE); Marcus Herrmann, Elchingen (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 14/068,335

(22) Filed: Oct. 31, 2013

(65) Prior Publication Data

US 2014/0116532 A1    May 1, 2014

(30) Foreign Application Priority Data

Oct. 31, 2012 (DE) .......................... 10 2012 021 319

(51) Int. Cl.
  *F16L 27/08* (2006.01)
  *B60K 17/14* (2006.01)
  *B60K 17/30* (2006.01)
  *B60K 7/00* (2006.01)

(52) U.S. Cl.
  CPC ................. *F16L 27/08* (2013.01); *B60K 17/14* (2013.01); *B60K 17/30* (2013.01); *B60K 7/0015* (2013.01); *Y10T 137/5762* (2015.04); *Y10T 137/86268* (2015.04)

(58) Field of Classification Search
  CPC ...... B60K 17/14; B60K 7/0015; B60K 17/30; F16L 27/08; Y10T 137/5762; Y10T 137/86268
  USPC ......................................................... 137/312
  See application file for complete search history.

(56) References Cited

U.S. PATENT DOCUMENTS

| | | | | |
|---|---|---|---|---|
| 3,865,207 | A * | 2/1975 | Schwab et al. ................. | 180/253 |
| 3,915,030 | A * | 10/1975 | Ritter ............................... | 475/83 |
| 4,271,725 | A * | 6/1981 | Takao et al. ..................... | 475/83 |
| 4,436,000 | A * | 3/1984 | Lenard et al. ..................... | 76/41 |
| 6,176,086 | B1 * | 1/2001 | Betz ............................... | 60/487 |
| 2008/0179128 | A1 * | 7/2008 | Iwaki et al. .................... | 180/242 |
| 2009/0301248 | A1 * | 12/2009 | Mohr et al. ................ | 74/473.11 |

FOREIGN PATENT DOCUMENTS

DE    75 032    7/1970
DE    100 30 900 A1    1/2002

* cited by examiner

*Primary Examiner* — Craig Schneider
*Assistant Examiner* — Kevin Barss
(74) *Attorney, Agent, or Firm* — Maginot, Moore & Beck LLP (57) ABSTRACT

A hydrostatic unit includes a hydraulic machine that is connected mechanically and hydraulically to a pressure medium supply via an adapter piece and a rotary leadthrough.

11 Claims, 7 Drawing Sheets

HYDROSTATIC UNIT AND ADAPTER PIECE

This application claims priority under 35 U.S.C. §119 to patent application no. DE 10 2012 021 319.0 filed on Oct. 31, 2012 in Germany, the disclosure of which is incorporated herein by reference in its entirety.

BACKGROUND

The disclosure relates to a hydrostatic unit, in particular a traction drive, and to an adapter piece which is suitable for this purpose.

A hydrostatic traction drive of this type is disclosed in DE 100 30 900 A1 and is used, for example, in agricultural or forestry utility vehicles for driving steerable wheels/axles. According to said document, a drive of this type has a hydraulic motor which is connected, for example, via a gear mechanism to the steerable wheel and is therefore also moved correspondingly when steering lock is applied. In the known solution, an axle stub is provided on the chassis side, on which axle stub a wheel support and therefore also the hydraulic motor and the gear mechanism are mounted via steering knuckle pins. In the known solution, the pressure medium supply of the hydraulic motor takes place via a rotary leadthrough which is mounted on the axle stub in the region of the steering knuckle pins and the rotatable section of which is also moved in accordance with the steering movement, with the result that fixed pipework is made possible between the inlet and outlet connections of the hydraulic motor and the connections of the rotary leadthrough.

It is the problem in said solution that the space for routing the pipeline is very restricted, with the result that considerable outlay in terms of apparatus and mounting is required, in order to install the pipelines.

DD 75 032 discloses a solution, in which ducts for the pressure medium supply of the hydraulic motor are formed in a control housing. However, the connection to the pressure medium inlet and the pressure medium outlet then takes place via hoses which are also pivoted when steering lock is applied and therefore have to be of elastic configuration. In a construction of this type having flexible hoses, it is disadvantageous that said hoses can be damaged as a result of the constant steering movements and become brittle and fragile over time. In addition, in particular when used in agricultural utility vehicles, there is the risk that the hose lines are torn off during operation.

In contrast, the disclosure is based on the object of providing a hydrostatic unit, in particular a drive, in which a rotatably mounted hydraulic motor can be supplied with pressure medium with increased reliability and a low outlay.

SUMMARY

This object is achieved by way of a hydrostatic unit and an adapter piece having the features of the disclosure.

Advantageous developments of the disclosure are the subject matter of the subclaims.

The hydrostatic unit according to the disclosure is configured, in particular, as a traction drive and has a hydraulic machine which is mounted pivotably on a suspension system, preferably a wheel suspension system, which traction drive is connected via at least one inlet flow path and one outlet flow path to a rotatable connection side of a rotary leadthrough. The connection side, mounted in a rotationally fixed manner, of the rotary leadthrough is in pressure medium connection with a pressure medium source, for example a pump, and a pressure medium sink, for example a tank. According to the disclosure, an adapter piece is provided which has a connection flange for attachment to the rotatable connection side of the rotary leadthrough. Furthermore, the connection piece is configured with a motor connection region which can be attached indirectly or directly to a housing of the hydraulic machine. Furthermore, the inlet flow paths and outlet flow paths are formed in the adapter piece, which inlet flow paths and outlet flow paths open into the connection flange on one side and into the motor connection region on the other side. This technical teaching permits said adapter piece to be integrated, as it were, into a housing element or else to be attached to the housing, with the result that a mechanical and hydraulic connection to the housing is produced in a very simple way.

As a result of the use of said adapter piece, in which the pressure medium guidance means from the rotary leadthrough to the hydraulic motor (hydraulic machine) is formed, the assembly is simplified considerably. Damage to the components during the steering movements is virtually ruled out.

In one preferred exemplary embodiment of the disclosure, the active faces of the connection flange and the motor connection region are arranged in planes which lie approximately at a right angle with respect to one another.

It is particularly preferred here if an active plane of the connection flange (connection flange plane) is arranged approximately perpendicularly with respect to the axis of the rotary leadthrough and the active plane of the motor connection region is arranged approximately perpendicularly with respect to the connection flange plane.

In other words, the two flange faces of the adapter piece are arranged approximately at a right angle with respect to one another, the connection region on the rotary leadthrough side running perpendicularly with respect to the axis of the rotary leadthrough.

The production of the adapter piece is particularly simple if said adapter piece is produced by casting.

The complexity for producing the hydraulic connection is simplified further if a leakage oil duct is also formed in the adapter piece, via which leakage oil duct a leak can be guided away from the hydraulic machine to the rotary leadthrough.

In one exemplary embodiment of the disclosure, the adapter piece is integrated into the housing of the hydraulic machine, for example a housing cover. In a further exemplary embodiment, the connection piece is flange-connected or fastened in another way to the housing of the hydraulic machine.

The fastening on the motor side can be simplified if a connection plate is provided which is arranged between a motor flange of the adapter piece and the hydraulic motor, with the result that the motor-side connection interface of the adapter piece differs from that of the hydraulic machine and can therefore be used in a plurality of motor types by way of a corresponding selection of the connection plate.

In the alternative exemplary embodiment without a connection plate, the motor flange has to be adapted correspondingly to the connection interface of the hydraulic motor.

The hydrostatic unit is preferably configured as a traction drive, it being possible for the hydraulic motor to be mounted together with a wheel support and optionally a gear mechanism which is connected in between on an approximately fork-shaped axle stub.

As explained, the adapter piece according to the disclosure has a connection flange which is designed for the mechanical and hydraulic coupling to a rotary leadthrough. Furthermore, the adapter piece has a motor connection region which forms the mechanical and hydraulic connection of a hydraulic machine, in particular of a hydraulic motor, or else can be attached to a connection plate of the hydraulic machine. Furthermore, inlet ducts and outlet ducts which open into the connection flange and into the motor connection region are formed in the adapter piece.

In one variant of the disclosure, the adapter piece is also configured with a leakage oil duct.

The hydraulic machine can be configured, for example, as an axial piston unit of oblique axis design or swash plate design, as a radial piston unit or in some other way.

BRIEF DESCRIPTION OF THE DRAWINGS

Advantageous developments of the disclosure will be explained in greater detail in the following text using diagrammatic drawings, in which.

DETAILED DESCRIPTION

In the following text, the disclosure will be shown using the example of a steerable rear wheel drive of an agricultural utility vehicle, for example a harvester.

Figure 1:
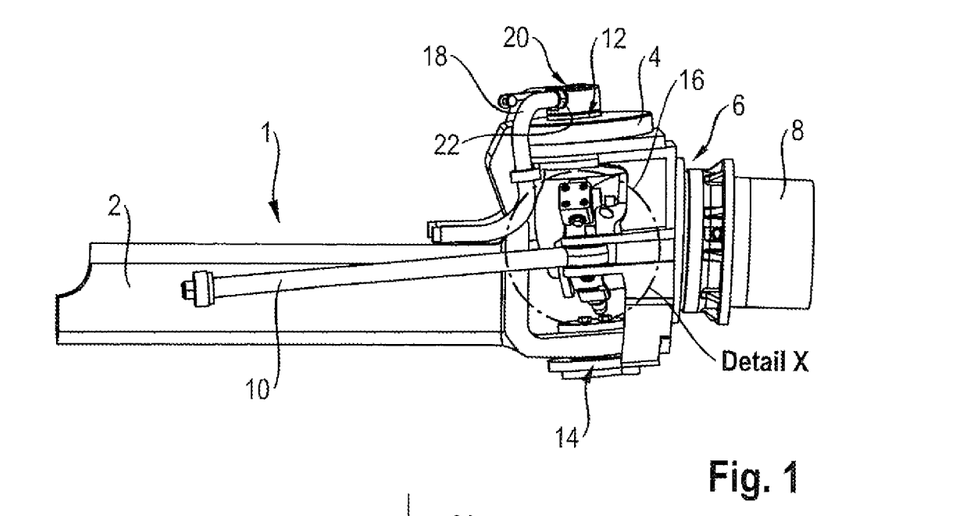
FIG. 1 shows a rear wheel drive of a harvester.

A steerable traction drive 1 of this type has an axle 2, to which a wheel support 6 is fastened via an axle stub 4, to which wheel support 6 a hub 8 of the driven wheel is fastened. The pivoting of the wheel support 6 takes place via a steering rod or a track rod 10 which pivots the wheel support 6 with respect to the axle stub 4 which is fixed on the axle depending on the steering lock. The articulation of the wheel support 6 on the axle stub 4 is effected by an upper and lower pivoting bearing 12, 14 which is configured in each case with a steering knuckle pin and an associated pivoting bearing. Details of said pivoting bearing are not shown in the illustration according to FIG. 1.

In the traction drive 1 which is shown, each wheel or each wheel hub 8 is assigned a hydraulic unit having a hydraulic motor which pivots with the hub 8 in accordance with the steering movement. The hydraulic motor can be coupled to the wheel hub 8 directly or else via a gear mechanism (not shown in greater detail) which is connected in between, for example a planetary drive or the like. The pressure medium supply of the hydraulic unit 16 takes place via pipelines 18 which are configured as a high pressure line, outlet line and/or leakage oil line. Said pipelines 18 can be of rigid configuration and are connected to the connection region 22 of a rotary leadthrough 20 which is arranged in the region of the upper pivoting bearing 12 and is mounted correspondingly on that region of the axle stub 4 which lies at the top in FIG. 1.

Details of said rotary leadthrough 20 and the hydraulic unit 16 will be explained using FIG. 2. In this illustration, the connection region 22 of the rotary leadthrough 20 can be seen, to which connection region 22 the high pressure line, the outlet line and optionally a leakage oil line are connected. Said connection region 22 is arranged in a stationary manner in relation to the axle stub 4, with the result that the fixed pipework which is mentioned is made possible.

The construction of a rotary leadthrough 20 of this type is sufficiently well known, for example from DE 100 30 900 A1 which was cited at the outset, with the result that further explanations can be dispensed with.

The pivotable outlet connection of the rotary leadthrough is connected via an adapter piece 24 to a hydraulic motor 26 of the hydrostatic unit 16. According to the illustration in FIG. 2, the axis of the rotary leadthrough 20 and therefore the attachment region of the hydraulic unit 16 on the rotary leadthrough 20 lie in a steering axis 28 of the driven wheel, the pressure medium supply of the hydraulic motor 26 taking place through the adapter piece 24. In the exemplary embodiment which is shown, the adapter piece 24 is not attached directly to the housing of the hydraulic motor 26, but rather to a connection plate 30, to the connection interface of which the connection interface of the adapter piece 24 is adapted and which also carries adjusting devices 32 for actuating the hydraulic motor 26. In the case in which said hydraulic motor 26 is configured as an axial piston unit of oblique axis design, a pendulum ball and, together with this, a cylinder drum can be adjusted via said adjusting devices 32, and the delivery/displacement volume can be set in this way.

As will be explained in further detail in the following text, however, the adapter piece 24 can also be integrated directly into the housing of the hydraulic motor 26.

The construction of the adapter piece 24 will be explained using FIGS. 3a to 3c which show different "transparent" views of the adapter piece 24, with the result that the pressure medium ducts are visible.

Figure 3A:
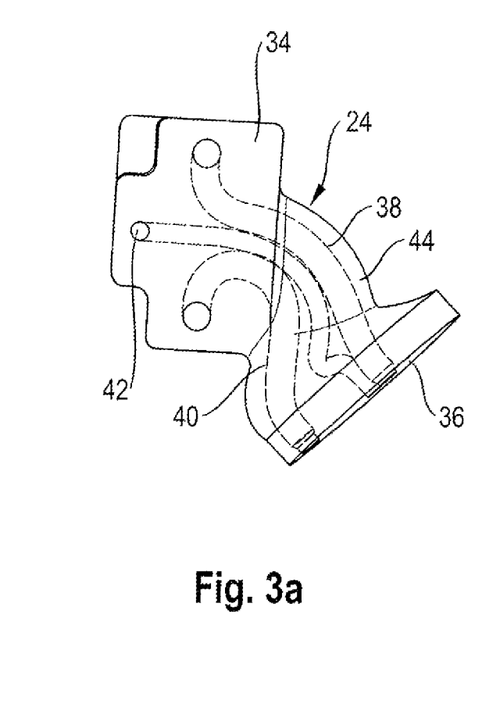
FIGS. 3a to 3c show views of the adapter piece of the rear wheel drive according to FIGS. 1 and 2, pressure medium flow paths being visible.

FIG. 3a shows the adapter piece 24 in a view perpendicularly onto a connection face of a motor flange 34, via which the adapter piece 24 is connected to the connection plate 30. It can be seen that a connection flange 36 on the rotary leadthrough side runs with its connection face in this view approximately perpendicularly with respect to the plane of the drawing, with the result that the planes which contain said two flanges 34, 36, the preferred plane of which can be considered to be the plane of the respective connection face, are arranged at a right angle with respect to one another. Accordingly, the steering axis 28 lies offset approximately by 90° with respect to the connection axis of the hydraulic motor 26. In the transparent illustration according to FIG. 3a, furthermore, two high pressure ducts are visible, of which, depending on the actuation of a driving direction valve, one serves as inlet duct 38 and one serves as outlet duct 40. Furthermore, a leakage oil duct 42 is illustrated, via which leakage from the hydraulic motor 26 can be guided to a tank (not shown) of the hydrostatic drive. These three ducts 38, 40, 42 open in each case into the connection region of the flanges 34, 36 and in the process penetrate a middle piece 44 which connects the two flanges 34, 36 to one another which are arranged perpendicularly with respect to one another and the geometry of which is designed with regard to optimum duct routing.

In the exemplary embodiment which is shown, the adapter piece 24 is produced by casting, with the result that the corresponding ducts are produced by inserted casting cores during the casting operation, which casting cores are then removed after the casting operation.

In the exemplary embodiment which is shown, the motor flange 34 is configured to be rectangular in the broadest sense, the connection interface of the motor flange 34 being selected depending on that of the connection plate 30. In principle, however, a standardized adapter piece 24 can also be used, the adaptation then taking place in each case via a specially designed connection plate 30.

Figure 3B:
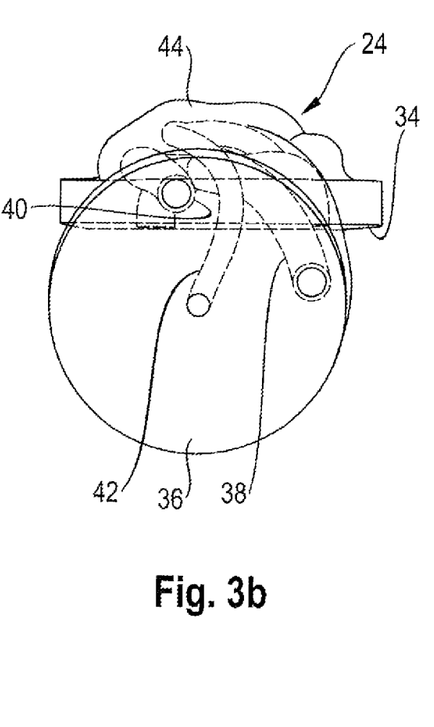

FIG. 3b shows a view of the adapter piece 24 as viewed from the connection flange 36. The flange face thereof is configured as a circular face similarly to the axial connection face 46 of the outlet of the rotary leadthrough 20, the connection interface accordingly being configured with respect to that of the rotary leadthrough 20.

Figure 3C:
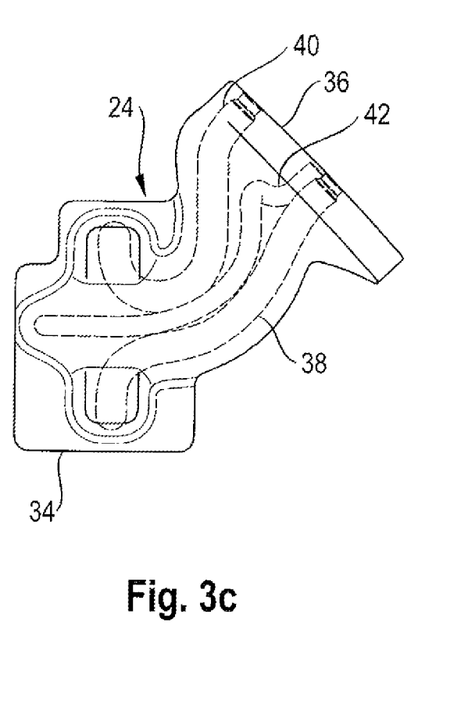

FIG. 3c shows a view of the adapter piece 24 from the rear side, that is to say from that side of the adapter piece 24 which is remote from the hydraulic motor 26. Accordingly, this view shows the rear side of the motor flange 34, the flange plane of which once again lies in the plane of the drawing. The flange plane of the connection flange 36 then runs perpendicularly with respect to the plane of the drawing. The ducts 38, 40, 42 can be seen once again in the transparent illustration.

Figure 4:
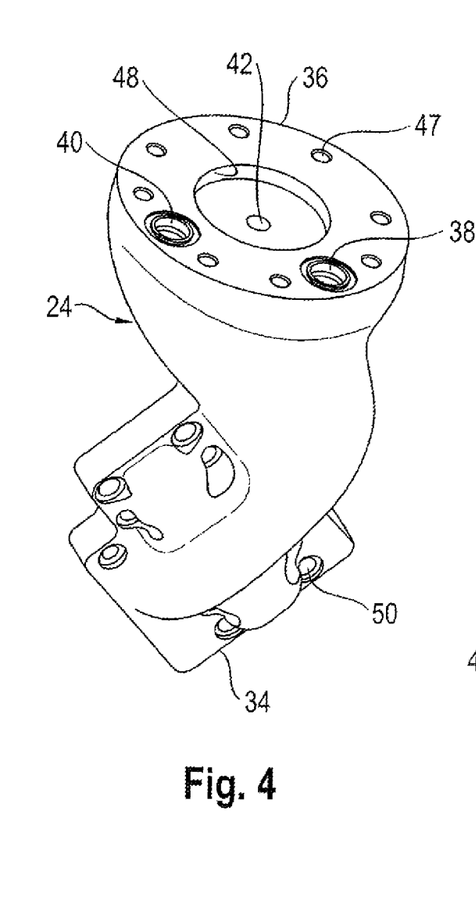
FIG. 4 shows an outer view of the adapter piece from FIG. 3.

FIG. 4 shows the adapter piece 24 in a non-transparent illustration. In this illustration, the connection flange 36 and motor flange 34 are arranged obliquely with respect to the plane of the drawing. The connection interface of the connection flange 36 is clearly visible with fastening holes 47 which lie on a common pitch circle, the opening regions of the outlet duct 40 and the inlet duct 38 (high pressure ducts) and of the centrally opening leakage oil duct 42 which opens into a hollow 48 of the flange face.

Fastening holes 50 of the motor flange 34 are also visible in the illustration according to FIG. 4.

Figure 5:
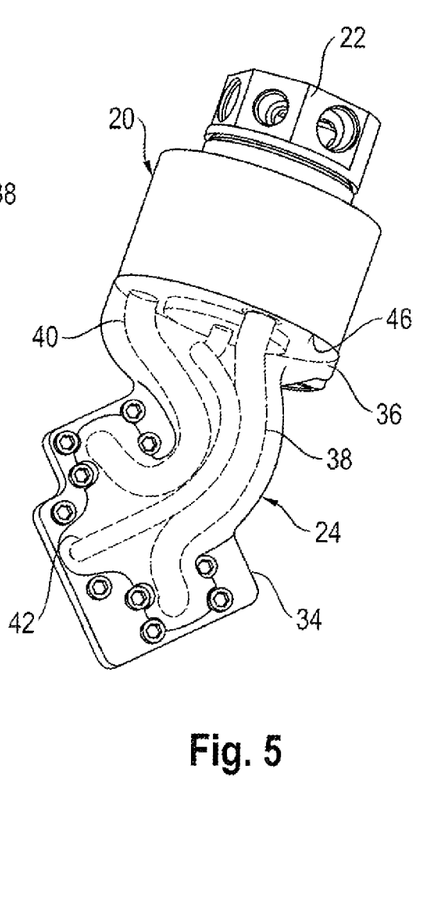
FIG. 5 shows an adapter piece according to FIG. 4 with an attached rotary leadthrough and visible pressure medium flow paths.

FIG. 5 shows a transparent illustration of the adapter piece 24 with an attached rotary leadthrough 20 which is connected by way of its connection face 46 to the connection flange 36 of corresponding configuration. The connection interface in the connection flange 36 of the adapter piece 24 is adapted to the connection interface of the rotary leadthrough 20.

Also shown in the illustration according to FIG. 5 is the non-rotatable connection region 22 of the rotary leadthrough 20, to which connection region 22 the pipelines 18 which were mentioned at the outset are connected, in order to make the feeding and discharge of pressure medium and the discharge of leakage oil possible.

Figure 6:
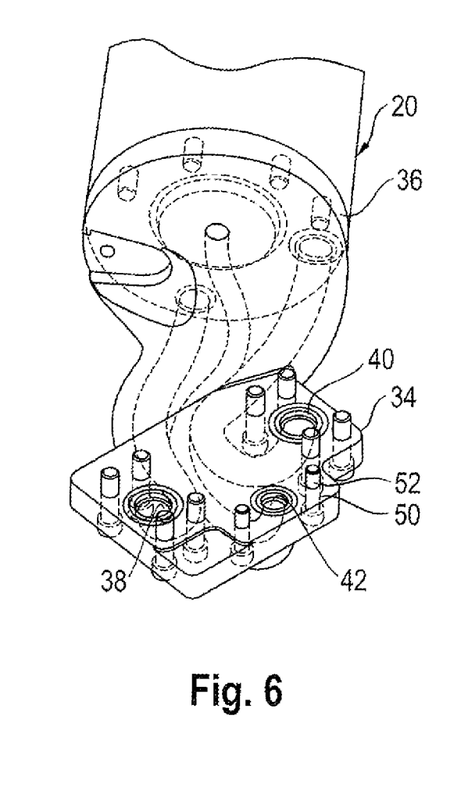
FIG. 6 shows a further view of the arrangement according to FIG. 5.

FIG. 6 shows a view of the arrangement according to FIG. 5 as viewed from the connection side of the motor flange 34. The fastening screws 52 which are inserted into the fastening holes 50 and the ducts 38, 40 (high pressure ducts) and 42 (leakage oil duct) which open into the motor flange face can be seen in said illustration. The motor-side connection interface is adapted to that of the connection plate 30.

Figure 7:
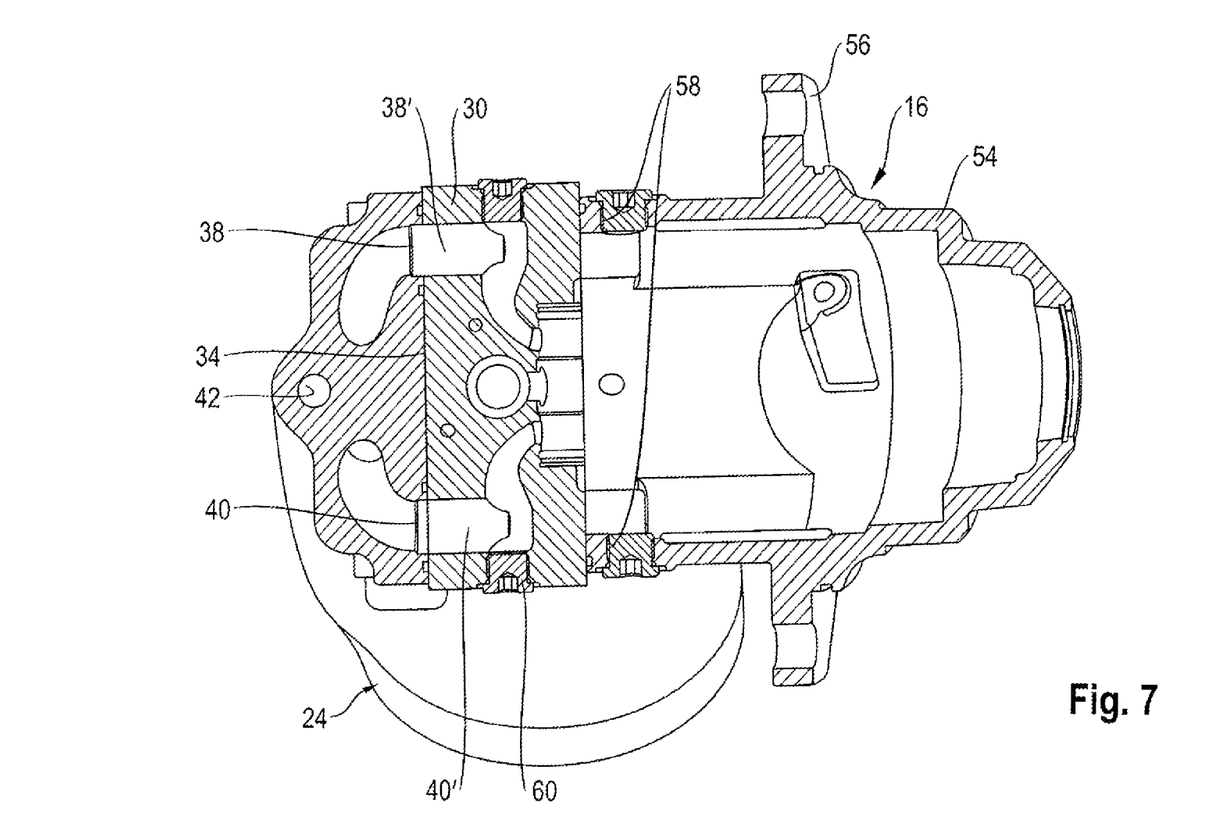
FIG. 7 shows an adapter piece according to FIGS. 3 to 6, which adapter piece is attached to a connection plate of a hydraulic motor housing.

FIG. 7 shows a sectional illustration of the hydraulic unit 16 with the adapter piece 24 which is attached by way of the motor flange 34 to the connection plate 30 which forms a cover of a housing 54 of the hydraulic motor 26. The drive mechanism of the hydraulic motor 26 is not shown for the sake of simplicity. A fastening flange 56 for fastening the hydraulic motor to the wheel support 6 is formed on the housing 54. Leakage oil connections 58 are formed as standard on the housing 54 of the hydraulic motor 26, which leakage oil connections 58 are closed by plugs in the exemplary embodiment which is shown, since the leakage oil discharge takes place via the above-described leakage oil duct 42.

The ducts 38, 40 which open into the motor flange 36 are partially visible in the sectional illustration according to FIG. 7, which ducts 38, 40 are in pressure medium connection with corresponding ducts 38' and 40', respectively, which open into the corresponding high pressure connection, low pressure connection and optionally leakage oil connection of the hydraulic motor 26. The latter can also act as a pump, with the result that recuperation is possible, for example, during braking or driving downhill Furthermore, plugs 60 which are provided for reasons of casting technology are shown in the illustration according to FIG. 7.

Figures 8, 9:
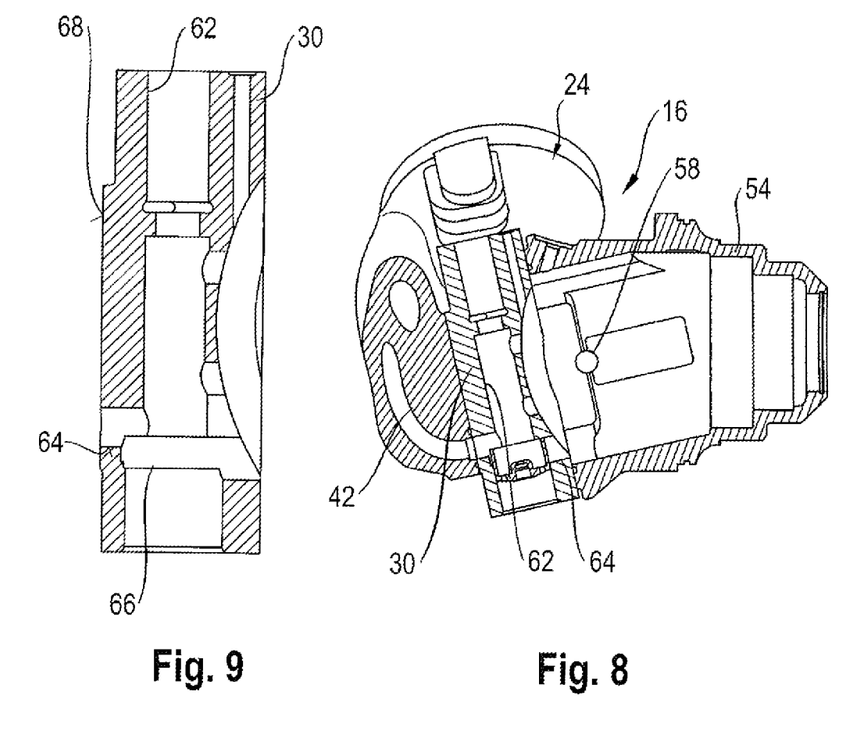
FIG. 8 shows one variant of the exemplary embodiment according to FIG. 7.
FIG. 9 shows an enlarged detailed illustration of a connection plate according to FIG. 8.

FIG. 8 shows a further section through the hydrostatic unit 16, the sectional course being selected to be offset approximately by 90° with respect to that in FIG. 7. This illustration shows the housing 54, which is bent at a medium pivoting angle according to the setting of the drive shaft, and the leakage oil connection 58 which is closed with a plug according to FIG. 7. A receiving hole 62 for the adjusting device 32 is formed in the connection plate 30, by means of which adjusting device 32 a pendulum ball of the hydraulic unit 16 which is of oblique axis design here can be adjusted, in order to change the displacement/delivery volume. In the exemplary embodiment which is shown, the discharge of the leakage takes place through the connection plate 30, a leakage oil leadthrough 64 which is in pressure medium connection with the housing interior being formed in said connection plate 30. An annular cutout 66 which forms a part of the leakage oil leadthrough 64 and reaches around the receiving hole 68 is provided in the region of the receiving hole 62. Said leakage oil leadthrough 64 is shown in FIG. 9.

Figure 10:
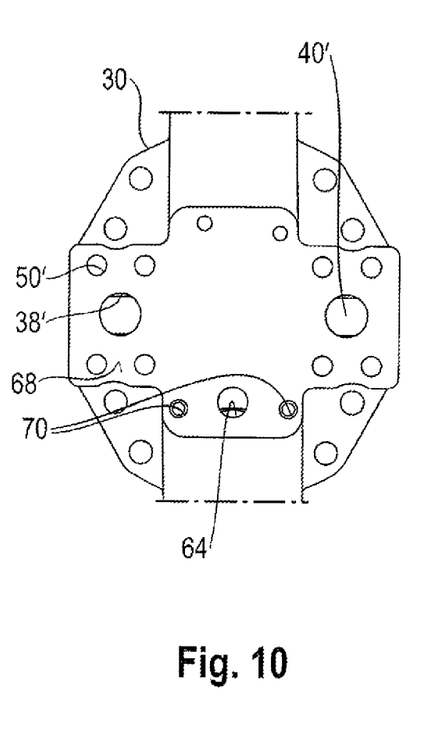
FIG. 10 shows a connection interface of the connection plate from FIG. 9.

According to FIG. 10, the leakage oil leadthrough 64 opens into a connection face 68 of the connection plate 30. The two duct sections 38' and 40' which are in pressure medium connection with the inlet duct 38 and the outlet duct 40 of the adapter piece 24 also open into said connection face 68.

As was explained at the outset, the connection plate 30 is attached by way of the connection face 68 to the connection flange 34 of the adapter piece 24, the connection interface both of the fastening holes 50' and the ducts corresponding to the connection interface of the adapter piece 24. Two additional connection threads 70 are provided in order to improve the sealing action in the region of the leakage oil leadthrough 64. Two slots are also formed in the above-described connection plate 30, which two slots are firstly in pressure medium connection with the ducts 38, 40 and are secondly connected in a known way via a pendulum ball to the respective working spaces, delimited by the axial pistons, for pressure medium feeding and discharging, depending on the rotary angle position of a cylinder drum.

Figure 2:
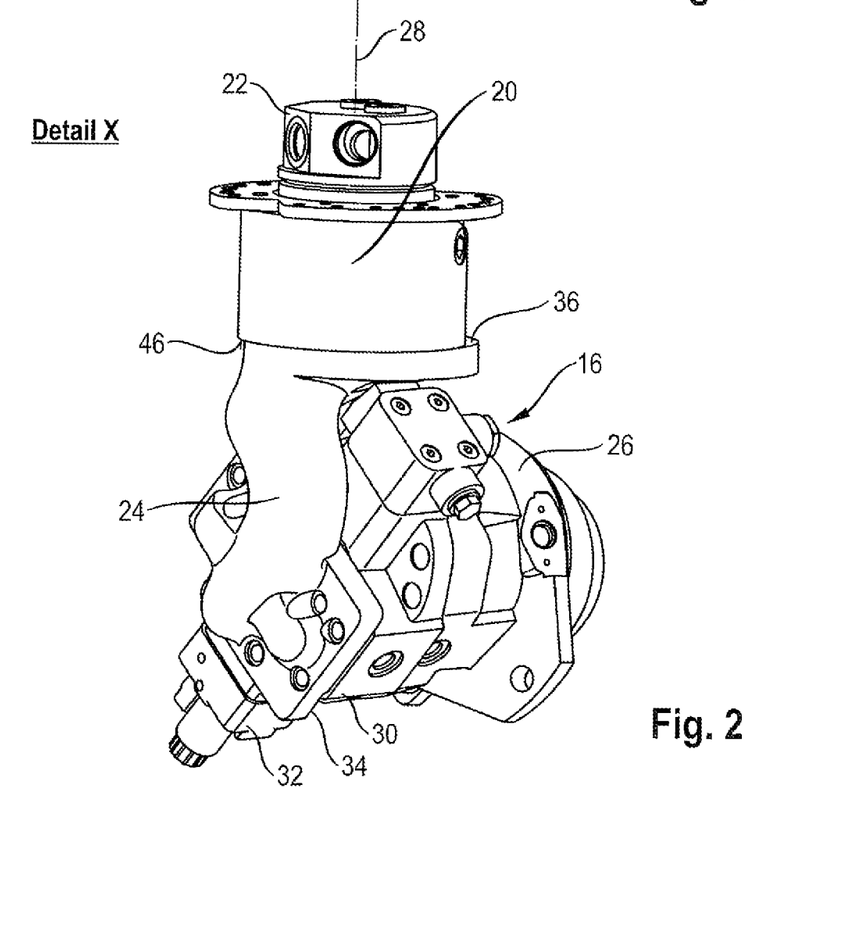
FIG. 2 shows a detail of the rear wheel drive according to FIG. 1.
Figure 11:
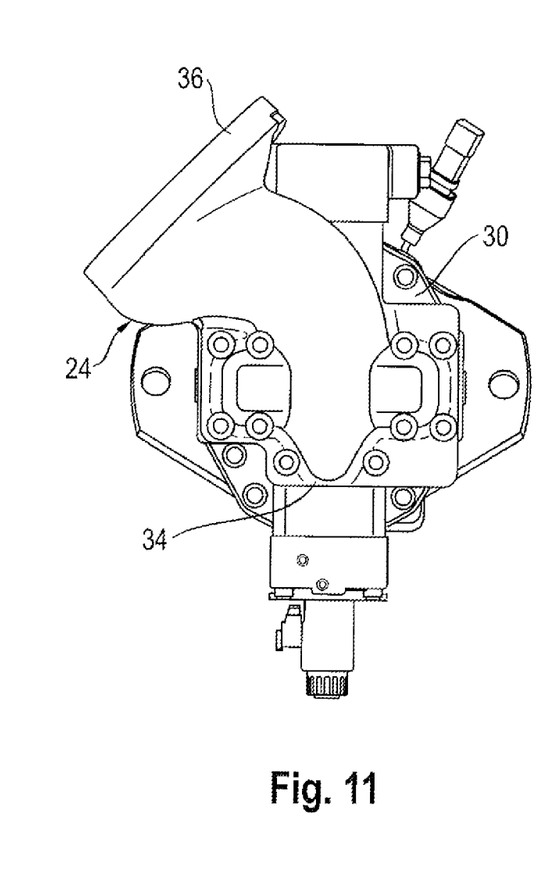
FIG. 11 shows a further view of a hydraulic unit having an adapter piece, a connection plate and a hydraulic motor.

FIG. 11 shows the hydrostatic unit 16 according to FIG. 2 without an attached rotary leadthrough 20. The adapter piece 24 can be seen with the connection flange 36 and the motor flange 34 which is screwed to the connection face 68 of the connection plate 30. As has been explained, the adjusting device for adjusting the pendulum ball and the abovementioned slots are formed in said connection plate, inter alia. The connection interface of the motor flange 34 corresponds to that of the connection plate 30. Said connection plate 30 forms, as explained, in practice the end-side termination of the housing 54 of the hydraulic motor 26, the shaft of which drives the wheel hub.

Figure 12:
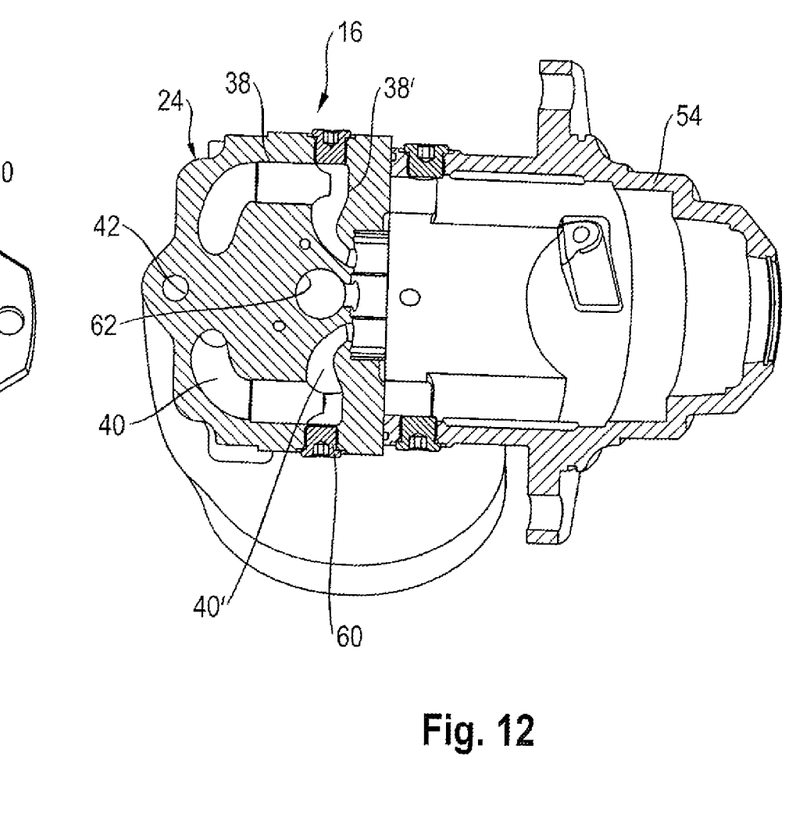
FIG. 12 shows a sectional illustration of a further exemplary embodiment of the disclosure, an adapter piece being integrated into a motor housing.

FIG. 12 shows a further exemplary embodiment of a hydraulic unit 16, in which exemplary embodiment the connection plate with the duct sections 38', 40', the receiving hole 62 for the adjusting device and the leakage oil leadthrough 64 (not shown in FIG. 12) is integrated into the adapter piece 24 and therefore forms a part of the housing. Plugs 60 for shutting off the ducts 38, 40 to the outside are also provided for reasons of casting technology in this exemplary embodiment.

Figure 13:
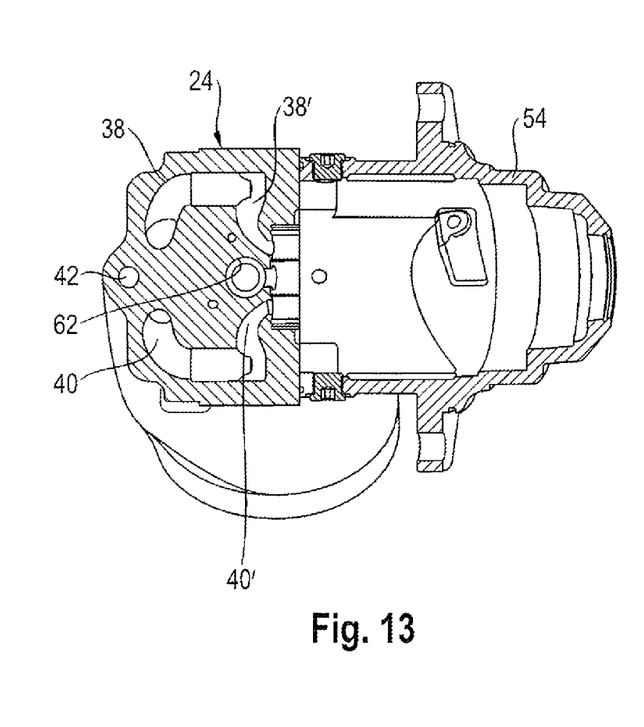
FIG. 13 shows a sectional illustration of one variant of the exemplary embodiment according to FIG. 1.

FIG. 13 shows an exemplary embodiment which corresponds to the exemplary embodiment from FIG. 12, in which the duct routing is designed in such a way that said plugs 60 can be dispensed with. Otherwise, said exemplary embodiment corresponds to the above-described exemplary embodiment, with the result that further explanations can be dispensed with.

Figure 14:
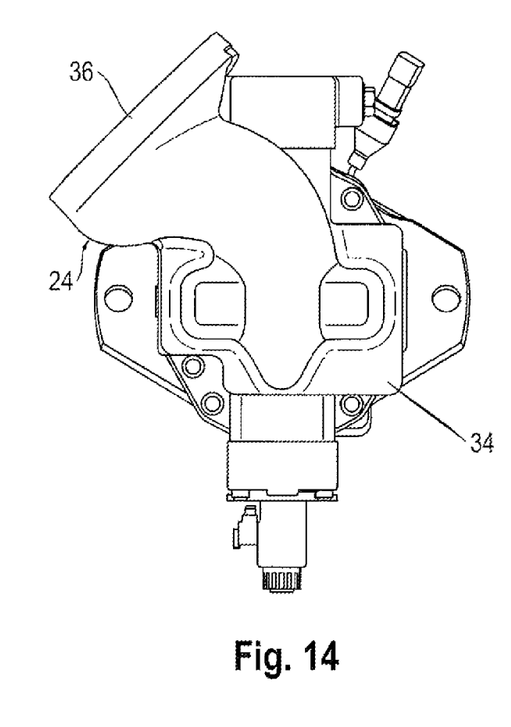
FIG. 14 shows an outer view of the hydraulic unit according to FIG. 12 or 13.

FIG. 14 shows a view, corresponding to FIG. 11, of the exemplary embodiment according to FIGS. 12 and 13 as viewed from the rear side of the adapter piece 24. It can be seen that the connection plate is integrated into the motor flange 34, with the result that the adapter piece 24 in practice forms the end-side termination/cover of the housing 54 of the hydraulic motor 26.

As has been explained, said hydraulic motor 26 can be configured as an axial piston unit (oblique axis or swash plate design), as a radial piston unit or in some other way.

The above-described hydrostatic/hydraulic unit is not restricted to use in traction drives, but rather can be used in principle everywhere where a hydraulic machine is mounted pivotably with respect to a pressure medium feed means and a pressure medium discharge means.

A hydrostatic unit having a hydraulic machine is disclosed, which is connected mechanically and hydraulically to a pressure medium supply via an adapter piece and a rotary leadthrough.

LIST OF DESIGNATIONS

1 Traction drive
2 Axle
4 Axle stub
6 Wheel support
8 Hub
10 Link
12 Upper pivoting bearing
14 Lower pivoting bearing
16 Hydraulic unit
18 Pipeline
20 Rotary leadthrough
22 Connection region
24 Adapter piece
26 Hydraulic machine/hydraulic motor
28 Steering axis
30 Connection plate
32 Adjusting device
34 Motor flange
36 Connection flange
38 Inlet duct
40 Outlet duct
42 Leakage oil duct
44 Middle piece
46 Connection face
47 Fastening hole
48 Hollow
50 Fastening hole
52 Fastening screw
54 Housing
56 Housing flange
58 Leakage oil connection
60 Plug
62 Receiving hole
64 Leakage oil leadthrough
66 Cutout
68 Connection face
70 Connection thread

What is claimed is:

1. A hydrostatic unit, comprising:
   a hydraulic machine mounted pivotably and connected via at least one inlet flow path and one outlet flow path to a rotatable connection side of a rotary leadthrough, the connection of which is mounted in a rotationally fixed manner and is in pressure medium connection with a pressure medium source and a pressure medium sink; and
   an adapter piece having (i) a connection flange configured to attach to the rotatable connection side of the rotary leadthrough and (ii) a motor connection region configured to indirectly or directly attach to a housing of the hydraulic machine, the inlet flow path and the outlet flow path being formed substantially in the adapter piece and opening into the connection flange on one side and into the motor connection region on the other side,
   wherein a leakage oil duct is formed in the adapter piece, the leakage oil duct opening into the connection flange and into the motor connection region.

2. The unit according to claim 1, wherein the connection flange and the motor connection region have flange or connection faces that lie in planes that are arranged approximately at a right angle with respect to one another.

3. The unit according to claim 2, wherein the connection flange is arranged approximately perpendicularly with respect to a steering axis of the rotary leadthrough and the motor connection region is arranged approximately perpendicularly with respect to the active face of the connection flange.

4. The unit according to claim 1, wherein the adapter piece is formed by casting.

5. The unit according to claim 1, wherein the motor connection region is formed by a motor flange.

6. The unit according to claim 1, wherein the adapter piece is configured to form a part of a housing of the hydraulic machine.

7. The unit according to claim 1, wherein the hydrostatic unit is configured as a traction drive.

8. A hydrostatic unit, comprising:
   a hydraulic machine mounted pivotably and connected via at least one inlet flow path and one outlet flow path to a rotatable connection side of a rotary leadthrough, the connection of which is mounted in a rotationally fixed manner and is in pressure medium connection with a pressure medium source and a pressure medium sink; and
   an adapter piece having (i) a connection flange configured to attach to the rotatable connection side of the rotary leadthrough and (ii) a motor connection region configured to indirectly or directly attach to a housing of the hydraulic machine, the inlet flow path and the outlet flow path being formed substantially in the adapter piece and opening into the connection flange on one side and into the motor connection region on the other side,
   wherein the motor connection region is formed by a motor flange, the hydrostatic unit further comprising a connection plate which is attached to the motor flange and through which the flow paths extend, the mechanical and hydraulic connections of the connection plate corresponding to the connection interface of the motor flange.

9. The unit according to claim 8, wherein a leakage oil duct extends through the connection plate.

10. A hydrostatic unit, comprising:
a hydraulic machine mounted pivotably and connected via at least one inlet flow path and one outlet flow path to a rotatable connection side of a rotary leadthrough, the connection of which is mounted in a rotationally fixed manner and is in pressure medium connection with a pressure medium source and a pressure medium sink; and
an adapter piece having (i) a connection flange configured to attach to the rotatable connection side of the rotary leadthrough and (ii) a motor connection region configured to indirectly or directly attach to a housing of the hydraulic machine, the inlet flow path and the outlet flow path being formed substantially in the adapter piece and opening into the connection flange on one side and into the motor connection region on the other side,
wherein the hydraulic machine is mounted on an approximately fork-shaped axle stub of an axle and is connected to a gear mechanism.

11. The unit according to claim 10, wherein the hydraulic machine is connected to a cycloid gear mechanism.

* * * * *